United States Patent
Moorman

(10) Patent No.: US 11,914,047 B2
(45) Date of Patent: Feb. 27, 2024

(54) SYSTEMS AND METHODS FOR PREDICTING IONOSPHERIC ELECTRON CONTENT

(71) Applicant: CACI, Inc.—Federal, Arlington, VA (US)

(72) Inventor: Isaac P. Moorman, Superior, CO (US)

(73) Assignee: CACI, Inc.—Federal, Reston, VA (US)

( * ) Notice: Subject to any disclaimer, the term of this patent is extended or adjusted under 35 U.S.C. 154(b) by 614 days.

(21) Appl. No.: 17/120,414

(22) Filed: Dec. 14, 2020

(65) Prior Publication Data
US 2022/0187473 A1 Jun. 16, 2022

(51) Int. Cl.
*G01S 19/07* (2010.01)
*G06N 3/08* (2023.01)
*G06N 20/00* (2019.01)

(52) U.S. Cl.
CPC .............. *G01S 19/072* (2019.08); *G06N 3/08* (2013.01); *G06N 20/00* (2019.01)

(58) Field of Classification Search
CPC ......... G01S 19/072; G06N 20/00; G06N 3/08
USPC .................................................... 342/357.44
See application file for complete search history.

(56) References Cited

FOREIGN PATENT DOCUMENTS

| CN | 110598851 A | 12/2019 | |
|---|---|---|---|
| WO | WO-2020118380 A1 * | 6/2020 | .............. G06F 21/32 |
| WO | WO-2021044866 A1 * | 3/2021 | ........... G01S 19/072 |

OTHER PUBLICATIONS

Sun et al., "Forecasting of Ionospheric Vertical Total Electron Content (TEC) Using LSTM Networks" IEEE, 2017, pp. 340-344.
Xu et al., "Satellite Image Prediction Relying on GAN and LSTM Neural Networks" IEEE, 2019, 6 pages; downloaded from IEEE Xplore on Dec. 23, 2020.

* cited by examiner

*Primary Examiner* — Harry K Liu
(74) *Attorney, Agent, or Firm* — BakerHostetler

(57) ABSTRACT

A system may be configured to predict total electron content (TEC) in an ionosphere. Some embodiments may: provide a machine learning (ML) model; obtain a dataset; input the dataset into the ML model; predict, for a predetermined number of days, the TEC using the ML model; and observe a performance improvement over the obtained dataset based on the prediction, the prediction being made for a region having a number of ground transmitters satisfying a sparseness criterion.

20 Claims, 13 Drawing Sheets

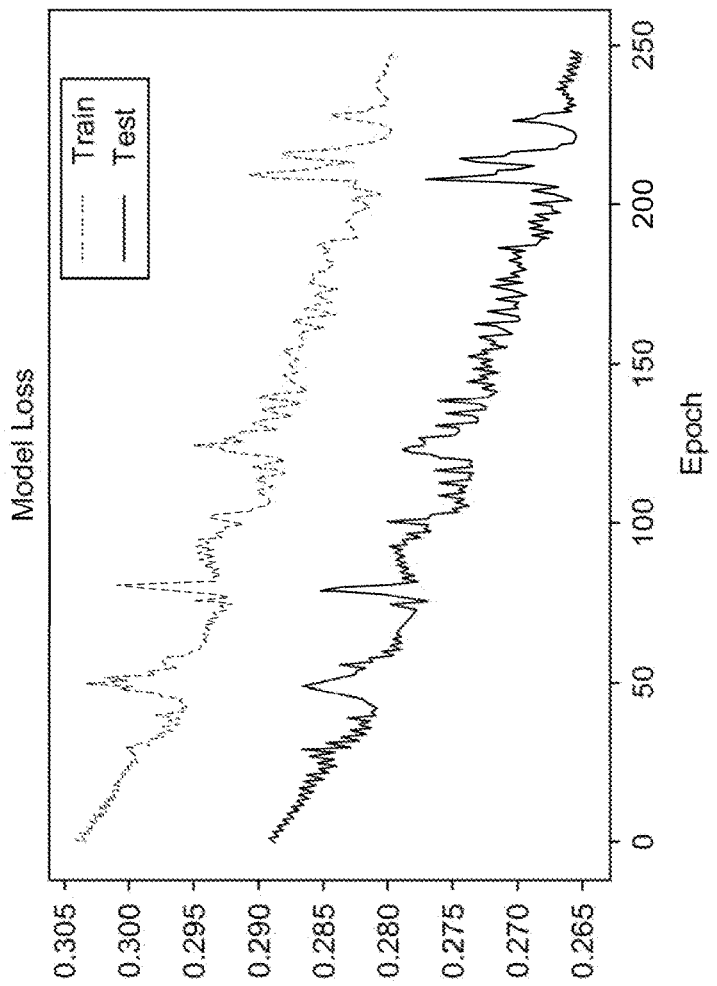
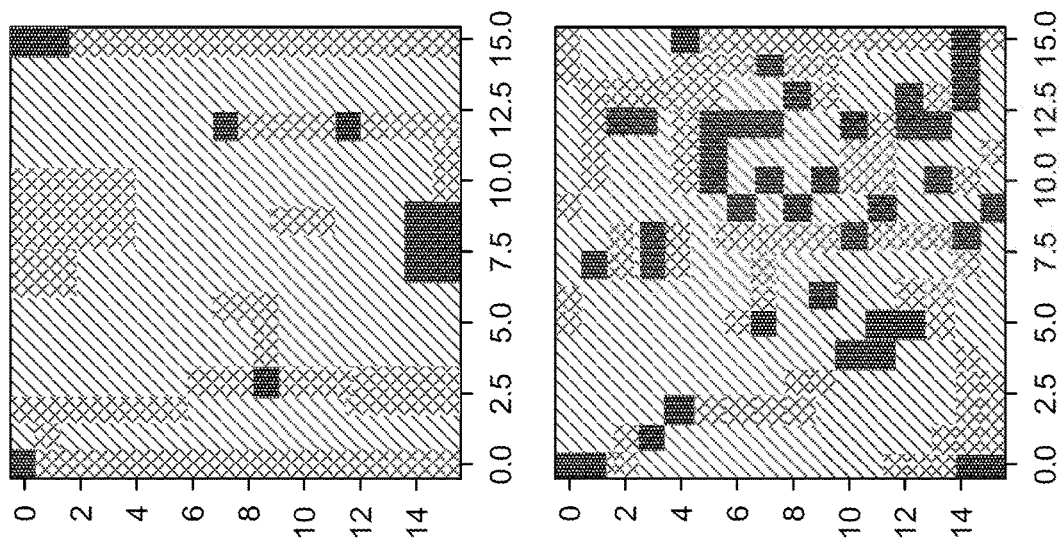
FIG. 7B
FIG. 7A

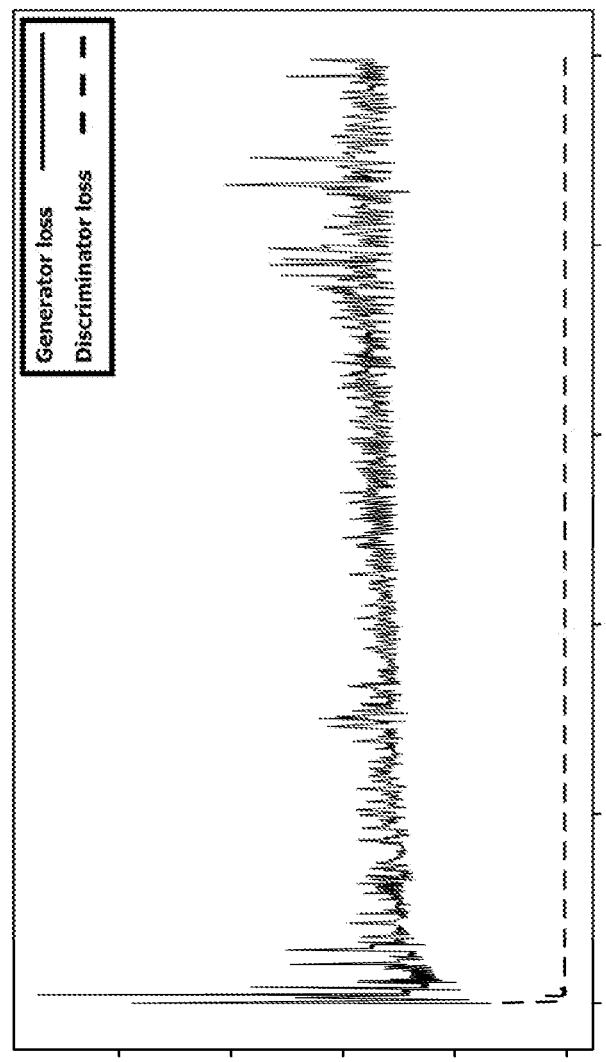
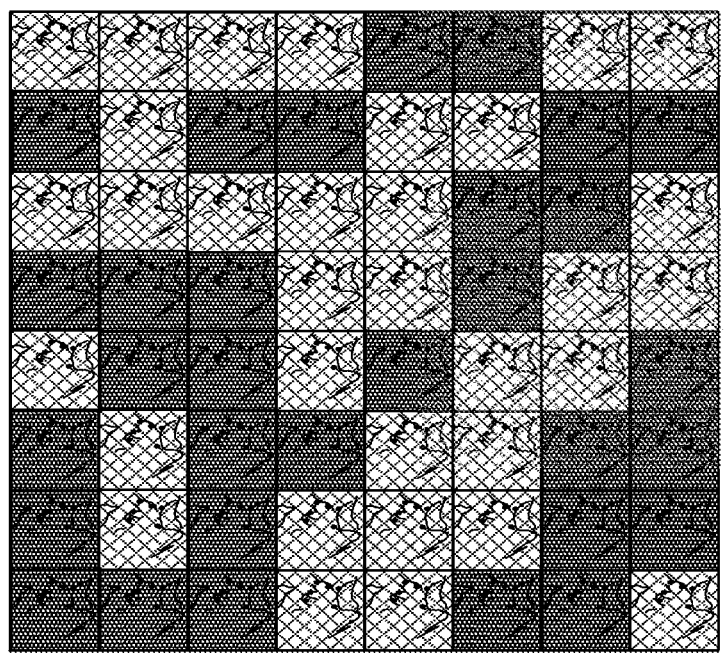
FIG. 10A
FIG. 10B

SYSTEMS AND METHODS FOR PREDICTING IONOSPHERIC ELECTRON CONTENT

TECHNICAL FIELD

The present disclosure relates generally to a recurrent neural network model for predicting electron content in the ionosphere.

BACKGROUND

In many areas around the world, such as certain places over oceans or in some rural areas, there are few to no ground transceivers. To determine and record total electron content (TEC), the terrestrial or ocean-based transceivers may communicate signals with the satellites. When electrons are too spaced out not present in a region, the TEC may be incalculable. That is, when there are few to no transceivers, the TEC is measured poorly and the data is collected very sparsely, requiring interpolation. As a result, the data ends up being less accurate in these areas with minimal coverage.

Radio signals emitted from an artificial earth satellite travelling in the ionosphere may be reflected from a time varying ionosphere and experience a Doppler shift in the frequency, when observed at a fixed point on the ground, such as by ground transceivers. Doppler shifts and other signal delays caused by the ionosphere (e.g., which reflects radio waves directed into the sky back toward the Earth) are expensive problems, and improving TEC predictions, especially in areas with a lack of coverage, can reduce such costs by improving current and future technology. For example, the time it takes for a signal from the ground to reach space and the exact location at which the signal ends (i.e., where the signal sent from the ground exits the atmosphere and enters space) may change. Without an accurate TEC, it may not be possible to correctly predict one or both of these changes. Satellite communications (e.g., involving scintillation, group and phase delays, and other aspects) may be more successful with accurate TEC. But institutions that determine TEC values are known to have issues with their software and/or recording equipment, resulting in errored data or data lapses.

SUMMARY

Systems and methods are disclosed for predicting current and future TEC values using a database having some errored values. One or more aspects of the present disclosure relate to a method, comprising: providing a machine learning (ML) model; obtaining a dataset; inputting the dataset into the ML model; predicting, for a predetermined number of days, the TEC using the ML model; and observing a performance improvement over the obtained dataset based on the prediction, the prediction being made for a region having a number of ground transmitters satisfying a sparseness criterion.

The method is implemented by a system comprising one or more hardware processors configured by machine-readable instructions and/or other components. The system comprises the one or more processors and other components or media, e.g., upon which machine-readable instructions may be executed. Implementations of any of the described techniques and architectures may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

FIGS. 6A, 7A, and 8A illustrate example TEC maps predicted after a progressively greater number of training epochs, in accordance with one or more embodiments.

FIGS. 6B, 78, and 8B illustrate example model losses being reduced after a progressively greater number of training epochs, in accordance with one or more embodiments.

FIG. 10A illustrates loss of a GAN model after a certain amount of training, in accordance with one or more embodiments.

FIG. 10B illustrates actual TEC values, in accordance with one or more embodiments.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other.

Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device.

Figure 1:
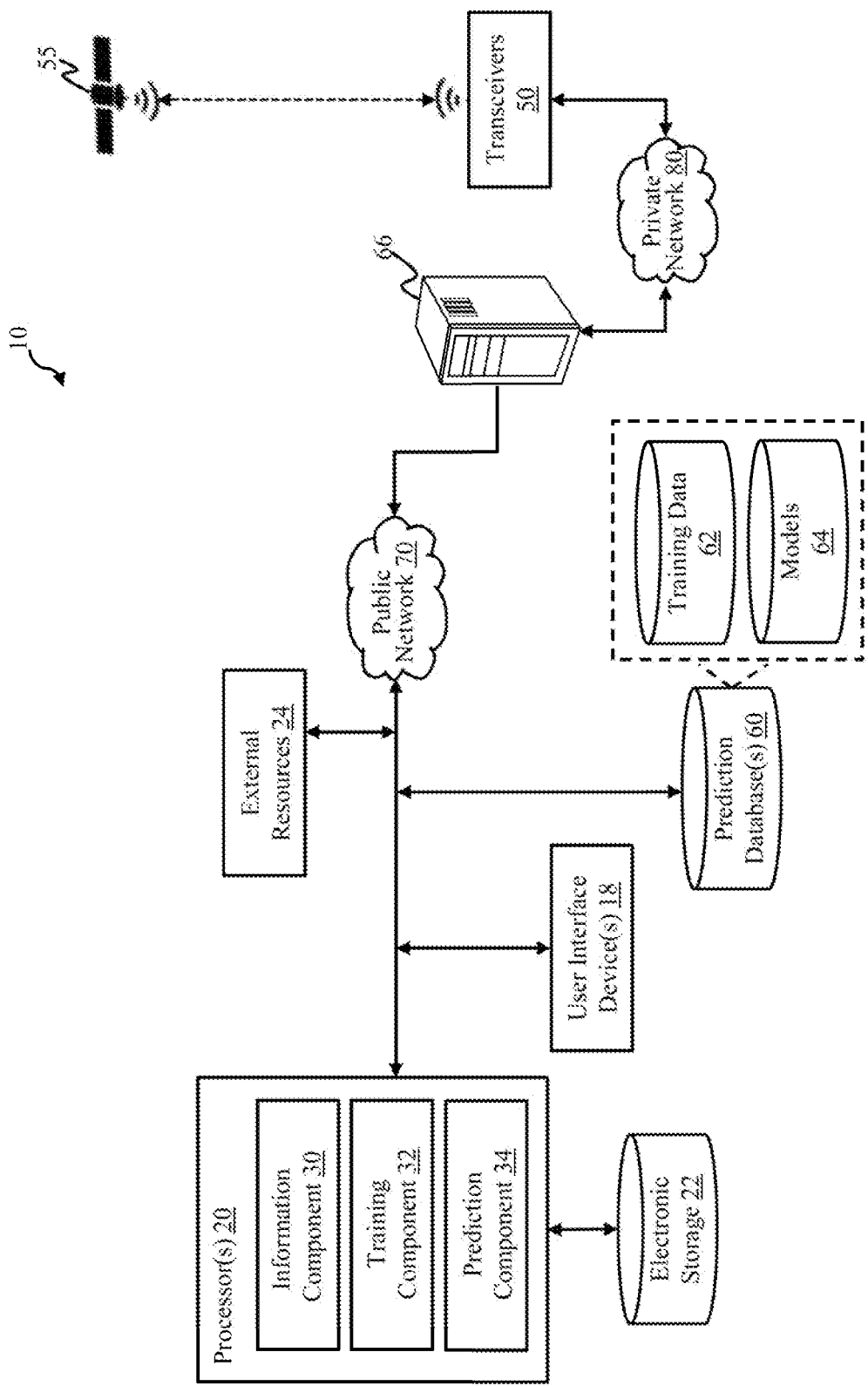
FIG. 1 illustrates an example of an artificially intelligent system in which ionospheric maps are predicted, in accordance with one or more embodiments.

FIG. 1 illustrates system 10 configured to predict, via a long short-term memory (LSTM) neural network combined with a generative adversarial network (GAN) neural network, the total electron content (TEC) in the ionosphere. This machine learning model predicts the future TEC (e.g., for a predetermined number of days, such as 3), and it determines the TEC in "dark" (e.g., with little to no transmitters) areas. By knowing the TEC better than existing databases, system 10 may better predict signal delays and the location of signals. One or more of these predictions may be used, e.g., to geolocate ground-based devices, such as global positioning system (GPS) receivers.

Knowing the TEC in locations with minimal ground transceivers leads to better knowledge of atmospheric signal delays, e.g., between such transceiver and a satellite. This delay can be translated into GPS positioning error.

Presently disclosed are ways of training two separate neural network models (e.g., an LSTM model and a GAN model) on historical ionospheric TEC data. Further disclosed is a way to combine these models into a pipeline such that future TEC data may be better forecasted. For example, unique modeling code in Python may be run on suitable hardware (e.g., graphics processing units (GPUs) or other computing architecture), to provide predictive capabilities on ionospheric images. As a result, both government and non-government satellite communication companies may benefit from usage of better knowledge of the TEC (e.g., of particular regions).

The ionosphere is the part of Earth's upper atmosphere ionized by solar radiation (e.g., ultraviolet (UV), X-ray, and shorter wavelengths), and it has a plasma allowing atmospheric electricity and influencing radio propagation. The layers of ionization may include the D layer (the innermost layer, which extends from about 48 to 90 kilometers (km) above the surface of Earth), the E layer (the middle layer), the Es layer (sporadic E-layer), and the F layer (the Appleton-Barnett layer, which extends further from about 150 km to more than 900 km).

An amount of TEC describes the ionosphere. Ionospheric TEC is involved in carrier phase delays of received radio signals transmitted from satellites located above the ionosphere, often using GPS. The TEC is path-dependent. And the ionospheric radio effect may be proportional to TEC and inversely proportional to the radio frequency. In ionospheric physics, TEC maps are used to show the total electron content in the upper atmosphere, which allows for the prediction of signal delays and Doppler shifts caused by the ionosphere.

Some embodiments of system 10 may, e.g., predict TEC maps using neural networks trained on data previously obtained from server 66 (or storage 22) and outperform this data in future predictions. Outperforming the obtained data may substantially increase over time, as the obtained data may have lapses in accurate recordings. Server or database 66 may be national oceanic and atmospheric administration (NOAA) or another governmental agency or private database, e.g., with access to recordings from transceivers 50.

Transceivers 55 may, e.g., be mounted on a platform on the ground and/or at sea to communicate with (e.g., ping) satellites 55. Server 66 may access recordings from these transceivers using private network 80, e.g., which may be wired or wireless.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise a memory controller and one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network, electronic storage, equipment related to Wi-Fi technology, equipment related to Bluetooth® technology, data entry devices, a power supply (e.g., battery powered or line-power connected, such as directly to 110 volts AC or indirectly via AC/DC conversion), a transmit/receive element (e.g., an antenna configured to transmit and/or receive wireless signals), a network interface controller (NIC), a display controller, a GPU, and/or other resources. In some implementations, some or all of the functionality attributed herein to external resources 24 may be provided by other components or resources included in system 10. Processor 20, external resources 24, user interface device 18, electronic storage 22, a network, and/or other components of system 10 may be configured to communicate with each other via wired and/or wireless connections, such as a network (e.g., a local area network (LAN), the Internet, a wide area network (WAN), a radio access network (RAN), a public switched telephone network (PSTN), etc.), cellular technology (e.g., GSM, UMTS, LTE, 5G, etc.), Wi-Fi technology, another wireless communications link (e.g., radio frequency (RF), microwave, infrared (IR), UV, visible light, cm wave, mm wave, etc.), a base station, and/or other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol version 4 (IPv4) and Internet Protocol version 6 (IPv6).

In some embodiments, processor(s) 20 may form part (e.g., in a same or separate housing) of a user device, a consumer electronics device, a mobile phone, a smartphone, a personal data assistant, a digital tablet/pad computer, a wearable device (e.g., watch), augmented reality (AR) googles, virtual reality (VR) googles, a reflective display, a personal computer, a laptop computer, a notebook computer, a work station, a server, a high performance computer (HPC), a vehicle (e.g., embedded computer, such as in a dashboard or in front of a seated occupant of a car or plane), a game or entertainment system, a set-top-box, a monitor, a television (TV), a panel, a space craft, or any other device. In some embodiments, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of information component 30, training component 32, prediction component 34, and/or other components. Processor 20 may be configured to execute components 30, 32, and/or 34 by: software; hardware; firmware; some combination of software, hardware, and/or firmware; and/or other mechanisms for configuring processing capabilities on processor 20.

It should be appreciated that although components 30, 32, and 34 are illustrated in FIG. 1 as being co-located within a single processing unit, in embodiments in which processor 20 comprises multiple processing units, one or more of components 30, 32, and/or 34 may be located remotely from the other components. For example, in some embodiments, each of processor components 30, 32, and 34 may comprise a separate and distinct set of processors. The description of the functionality provided by the different components 30, 32, and/or 34 described below is for illustrative purposes, and is not intended to be limiting, as any of components 30, 32, and/or 34 may provide more or less functionality than is described. For example, one or more of components 30, 32, and/or 34 may be eliminated, and some or all of its functionality may be provided by other components 30, 32, and/or 34. As another example, processor 20 may be configured to execute one or more additional components that may perform some or all of the functionality attributed below to one of components 30, 32, and/or 34.

Artificial neural networks (ANNs) are models used in machine learning and may include statistical learning algorithms conceived from biological neural networks (particularly of the brain in the central nervous system of an animal) in machine learning and cognitive science. ANNs may refer generally to models that have artificial neurons (nodes) forming a network through synaptic interconnections (weights), and acquires problem-solving capability as the strengths of the interconnections are adjusted, e.g., at least throughout training. The terms 'artificial neural network' and 'neural network' may be used interchangeably herein.

An ANN may be configured to determine a classification based on input image(s) or other sensed information. An ANN is a network or circuit of artificial neurons or nodes. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and may perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the front neural units. In some embodiments, stimulation and inhibition for neural networks may be more free-flowing, with connections interacting in a more chaotic and complex fashion.

Disclosed implementations of artificial neural networks may apply a weight and transform the input data by applying a function, this transformation being a neural layer. The function may be linear or, more preferably, a nonlinear activation function, such as a logistic sigmoid, Tan h, or rectified linear activation function (ReLU) function. Intermediate outputs of one layer may be used as the input into a next layer. The neural network through repeated transformations learns multiple layers that may be combined into a final layer that makes predictions. This learning (i.e., training) may be performed by varying weights or parameters to minimize the difference between the predictions and expected values. In some embodiments, information may be fed forward from one layer to the next. In these or other embodiments, the neural network may have memory or feedback loops that form, e.g., a neural network. Some embodiments may cause parameters to be adjusted, e.g., via back-propagation.

An ANN is characterized by features of its model, the features including an activation function, a loss or cost function, a learning algorithm, an optimization algorithm, and so forth. The structure of an ANN may be determined by a number of factors, including the number of hidden layers, the number of hidden nodes included in each hidden layer, input feature vectors, target feature vectors, and so forth. Hyperparameters may include various parameters which need to be initially set for learning, much like the initial values of model parameters. The model parameters may include various parameters sought to be determined through learning. And the hyperparameters are set before learning, and model parameters can be set through learning to specify the architecture of the ANN.

Learning rate and accuracy of an ANN rely not only on the structure and learning optimization algorithms of the ANN but also on the hyperparameters thereof. Therefore, in order to obtain a good learning model, it is important to choose a proper structure and learning algorithms for the ANN, but also to choose proper hyperparameters.

The hyperparameters may include initial values of weights and biases between nodes, mini-batch size, iteration number, learning rate, and so forth. Furthermore, the model parameters may include a weight between nodes, a bias between nodes, and so forth.

In general, the ANN is first trained by experimentally setting hyperparameters to various values, and based on the results of training, the hyperparameters can be set to optimal values that provide a stable learning rate and accuracy.

Some embodiments of models 64 may comprise a convolutional neural network (CNN). A CNN may comprise an input and an output layer, as well as multiple hidden layers. The hidden layers of a CNN typically comprise a series of convolutional layers that convolve with a multiplication or other dot product. The activation function is commonly a ReLU layer, and is subsequently followed by additional convolutions such as pooling layers, fully connected layers and normalization layers, referred to as hidden layers because their inputs and outputs are masked by the activation function and final convolution.

The CNN computes an output value by applying a specific function to the input values coming from the receptive field in the previous layer. The function that is applied to the input values is determined by a vector of weights and a bias (typically real numbers). Learning, in a neural network, progresses by making iterative adjustments to these biases and weights. The vector of weights and the bias are called filters and represent particular features of the input (e.g., a particular shape).

A recurrent neural network (RNN) is a class of artificial neural networks where connections between nodes form a directed graph along a temporal sequence. Temporal dynamic behavior can be shown from the graph. RNNs employ internal state memory to process variable length sequences of inputs. An RNN may have inputs that are not fixed, such as an input sequence, which are transformed into an output sequence while taking into account contextual information in a flexible way.

In some embodiments, the learning of models 64 may be of reinforcement, supervised, and/or unsupervised type. For example, there may be a model for certain predictions that is learned with one of these types but another model for other predictions may be learned with another of these types.

Deep reinforcement learning (DRL) techniques capture the complexities of an environment in a model-free manner and learn about it from direct observation. DRL can be deployed in different ways such as for example via a centralized controller, hierarchal or in a fully distributed manner. There are many DRL algorithms and examples of their applications to various environments. In some embodiments, deep learning techniques may be used to solve complicated decision-making problems in wireless network optimization. For example, deep learning networks may be trained to adjust one or more parameters of a network with respect to an optimization goal.

Supervised learning is the machine learning task of learning a function that maps an input to an output based on example input-output pairs. It may infer a function from labeled training data comprising a set of training examples. In supervised learning, each example is a pair consisting of an input object (typically a vector) and a desired output value (the supervisory signal). A supervised learning algorithm analyzes the training data and produces an inferred function, which can be used for mapping new examples. And the algorithm may correctly determine the class labels for unseen instances.

Unsupervised learning is a type of machine learning that looks for previously undetected patterns in a dataset with no pre-existing labels. In contrast to supervised learning that usually makes use of human-labeled data, unsupervised learning does not via principal component (e.g., to preprocess and reduce the dimensionality of high-dimensional datasets while preserving the original structure and relationships inherent to the original dataset) and cluster analysis (e.g., which identifies commonalities in the data and reacts based on the presence or absence of such commonalities in each new piece of data). Semi-supervised learning is also contemplated, which makes use of supervised and unsupervised techniques.

Models 64 may analyze made predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input data. For example, a labeled training dataset may enable model improvement. That is, the training model may use a validation set of data to iterate over model parameters until the point where it arrives at a final set of parameters/weights to use in the model.

Training data 62 obtained from prediction database 60 of FIG. 1 may comprise hundreds, thousands, or even many millions of pieces of information (e.g., images or other sensed data). The dataset may be split between training, validation, and test sets in any suitable fashion. For example, some embodiments may use about 60% or 80% of the images for training or validation, and the other about 40% or 20% may be used for validation or testing. In another example, the labelled images may be randomly split, the exact ratio of training versus test data varying throughout. When a satisfactory model is found, prediction component 34 may train it on 95% of the training data and validate it further on the remaining 5%.

The validation set may be a subset of the training data, which is kept hidden from the model to test accuracy of the model. The test set may be a dataset, which is new to the model to test accuracy of the model. The training dataset used to train prediction models 64 may leverage, via prediction component 34, an SQL server and a Pivotal Greenplum database for data storage and extraction purposes.

In some embodiments, training component 32 may be configured to obtain training data from any suitable source, via electronic storage 22, external resources 24 (e.g., which may include sensors), public network 70, and/or UI device (s) 18. The training data may comprise captured images, smells, light/colors, shape sizes, noises or other sounds, and/or other discrete instances of sensed information.

In some embodiments, training component 32 may enable the LSTM, GAN, and/or one or more prediction models to be trained. The training of the neural networks may be performed via several iterations. For each training iteration, a classification prediction (e.g., output of a layer) of the neural network(s) may be determined and compared to the corresponding, known classification. Once trained, the model(s) may be stored in database/storage 64 of prediction database 60, as shown in FIG. 1, and then used to classify.

Figure 2A:
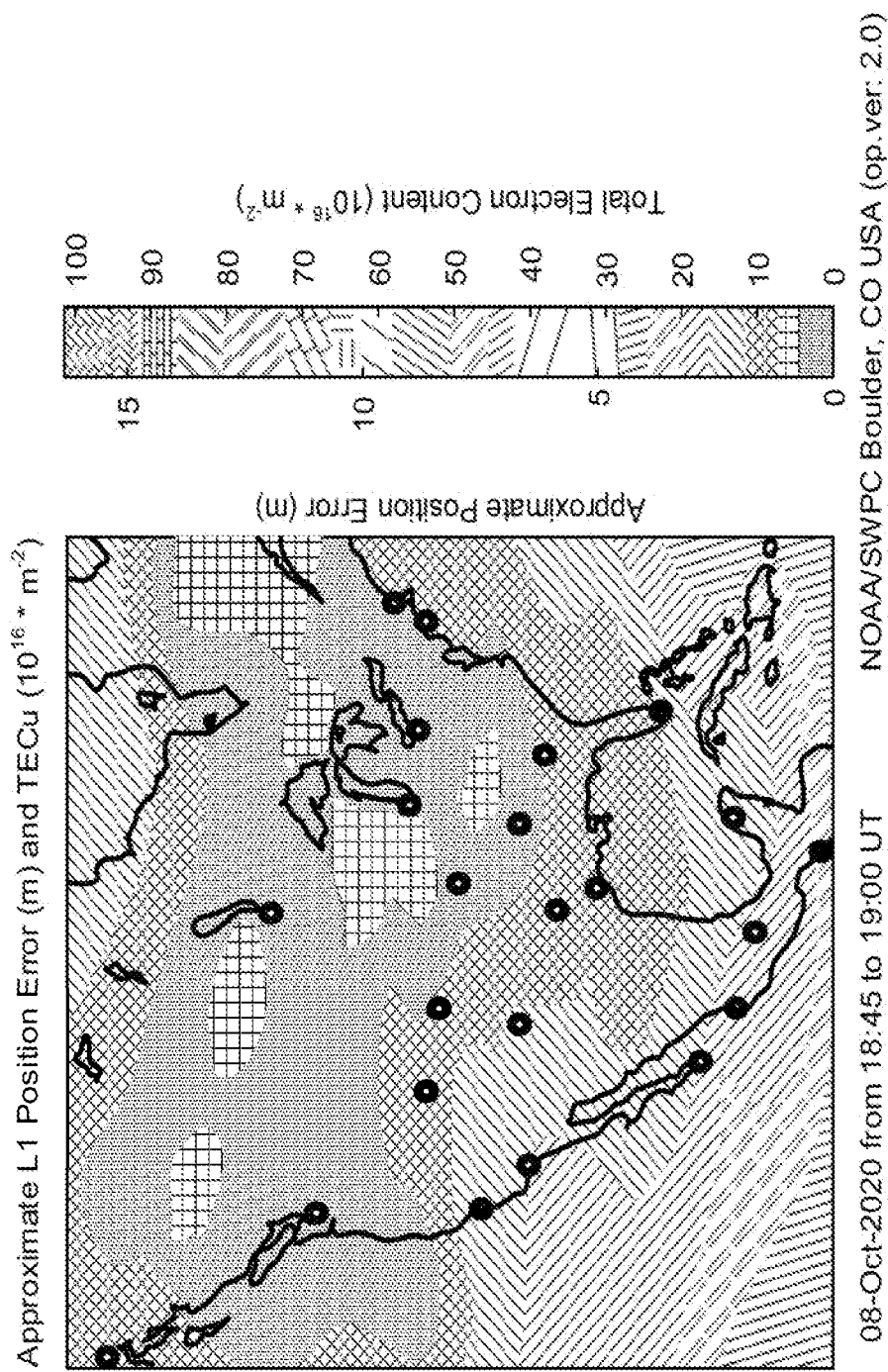
FIG. 2A illustrates an example TEC map, in accordance with one or more embodiments.

FIG. 2A depicts an example of one instance from training data 62 and of data inputted from server 66. For example, the latter inputted data may be obtained by system 10 as another set every period of time (e.g., every 15 minutes). In an example, the obtained images may be stamped as to a day and/or time (e.g., within the past 3 days), and the predicted images may similarly be stamped (e.g., within 3 days of the future). As such, predictive model 64 may exemplarily input a previous amount of data to predict a following amount of data for maps. For example, an input array may be comprised of 288 images or an array (e.g., 3,96,16,16,3), and an output array may be similarly comprised of 288 images or another array (e.g., 3,96,16,16,3), which will be further discussed.

Figure 2B:
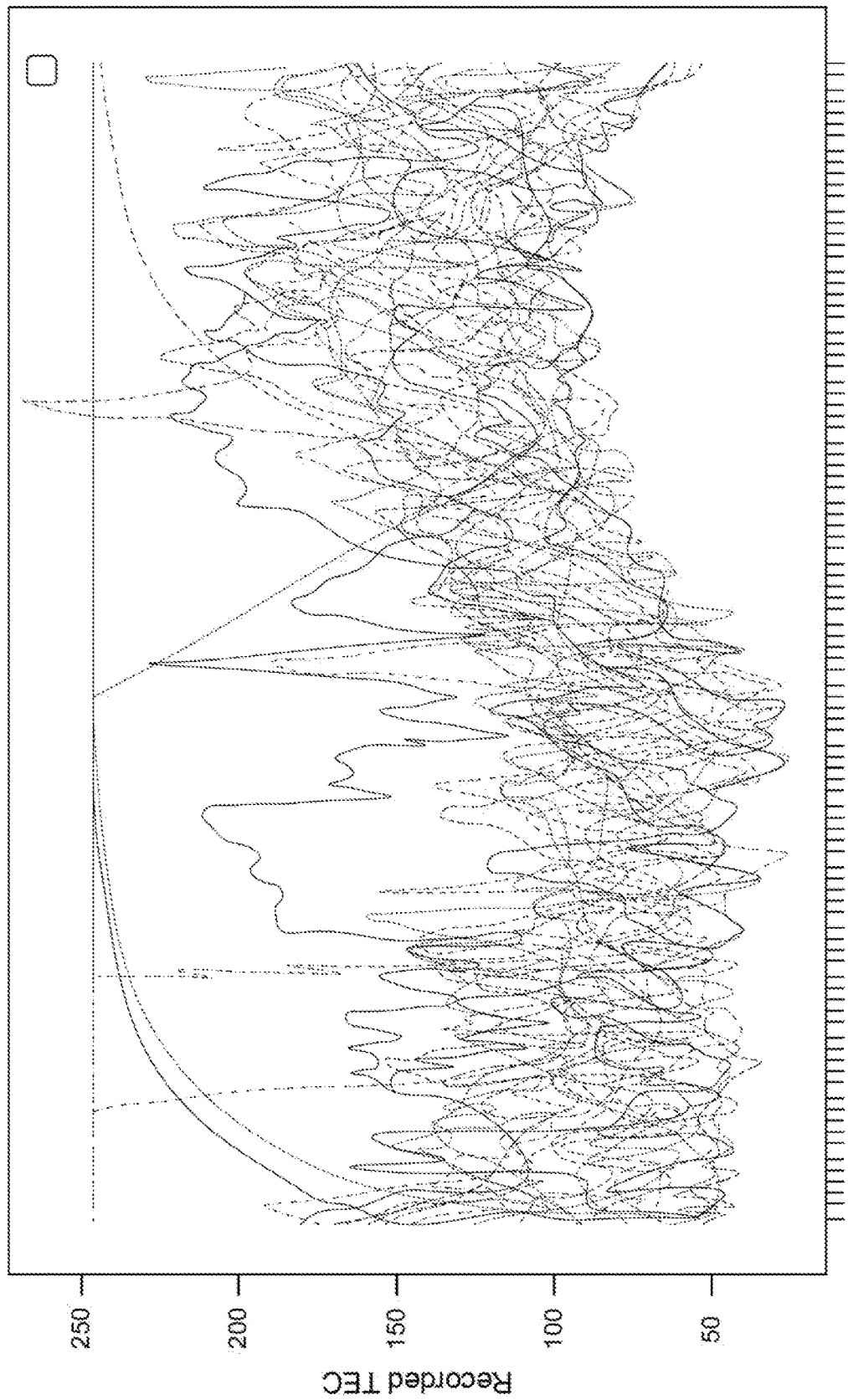
FIG. 2B illustrates a plurality of TEC recordings for a region, in accordance with one or more embodiments.

FIG. 2B depicts a representation of a whole year's worth of TEC data throughout the day, for every day of a year of a certain region (e.g., Miami, Florida), which are grafted in overlaying fashion. That is, each different line may represent a different recording for an individual day, resulting in 365 lines for the TEC data throughout the year. In this depiction, not all of the plotted TEC data of respective days is valid. That is, there are some outliers (e.g., as depicted by the lines in the upper half of FIG. 2B), which exemplify issues that data from server 66 may have. One issue may be that the TEC data is the same throughout the day everywhere in the country. Another issue may be that the data all has the same exact motion, which may be substantially higher than what the TEC should be. In some embodiments, prediction component 34 may avoid generating outputs with any resulting effects from such errors. For example, little or no interpolation may be required from system 10.

In some embodiments, LSTM-GAN model 64 may outperform data obtained from server 66, over time. That is, this data may comprise lapses and/or errors in the recordings from transceivers 50. Thus, by keeping the root-mean-squared error (RMSE) small, as progressively shown in FIGS. 6-8, model 64 may predict very close to where this obtained data is, even at 99% accuracy or above. For example, when the obtained data comprises an outlier or lapse in recording, this model may predict a value in a normal range. As such, system 10 may predict a TEC value different from what would be expected by the obtained outlier or error, but this prediction is more likely to have the correct value.

In some embodiments, information component 30 may extract datasets from other data obtained from server 66 and/or electronic storage 22. For example, information component 30 may loop through dates and times to download, un-tar, and un-zip files.

Then, information component 30 may, e.g., compare RGB arrays of each pixel representing a color intensity of the TEC map predicted by prediction component 34 to each pixel of an image extracted from an unzipped file of server 66. For example, an RMSE may be used on a pixel by pixel basis to determine performance of model 64 versus a report from server 66. And then this component may first-determine how accurate or how far off the predicted value is to second-determine a value based on the first determination.

TEC recordings obtained from server 66 may be considered ground truth on days when there are no lapses. When encountering these lapses, the prediction of model 64 may recognize and avoid them such that, over time, the more lapses that are encountered over time the more lapses may be avoided to have more accurate output data as a whole (e.g., when compared to original data from server 66).

In an implementation, upon obtaining images of TEC maps from server 66, the obtained images may be pre-processed. For example, system 10 may access online images by downloading via an organization, such as NOAA. Then processor 20 may extract portion(s) of the images, e.g., to perform pre-processing of the images. For example, information component 30 may optionally crop images down into just a map, the images being obtained having a border and a key. Information component may thus discard those other items to result in only the image portion(s), for such subsequent operations as (i) optionally scaling the extracted image portion(s) down (e.g., via compression) and (ii) converting these portions into (e.g., RGB, cyan magenta yellow black (CMYK), or another color system) pixel arrays. Information component 30 may thus, e.g., cause operations via (e.g., full-color) input image(s) such that training component 32 and/or prediction component 34 operate using resultant arrays or matrices of numbers. The cropping may remove any border (or other peripheral items) such that the map (e.g., having a pixel resolution width and height of 343 by 432) is extracted. And the scaling may, e.g., be performed such that an array or matrix (e.g., 16 by 16) of pixels is generated to speed up training and processing time.

Further, information component 30 may identify a key or legend that maps TEC values to colors. In some embodiments, information component 30 may convert the predicted RGB image to TEC values. This may be done after any cropping of the map is performed and may be performed using a key or legend, which may be further present in an input image. For example, the key or legend may have a color gradient, each color of which exemplarily mapping to a different TEC value. Information component 30 may, e.g., convert that color gradient to RGB values and then map each RGB value to its corresponding TEC value. This operation may be performed for each different provider of input data, e.g., since each such provider may use different color intensities or other symbolic representation to represent TEC. For example, in the examples of FIGS. 2A, 6A, 7A, and 8A from NOAA darker blues represent lower TEC values (i.e., RGB values may be translated to a TEC value to better compare predictions across different platforms and agencies). In this or another example, information component 30 may interpret colors of images, e.g., with each of red, green, and blue being represented by 256 or another number of values. Each of any other interpretable parameters may be based on hue (e.g., represented by 240 or another number of values), saturation (e.g., represented by 241 or another number of values), and/or luminosity (e.g., represented by 241 or another number of values).

Information component 30 may, e.g., perform one or more other dimensional adjustments on the inputted data and/or the preprocessed data. For example, some implementations may have an outline of a map artificially inserted-over or overlaying data. Accordingly, by information component 30 removing the map depiction before the prediction, prediction component 34 may generate data that is more accurate.

In some embodiments, system 10 parameters, such as weights and biases, may be trainable. These weights and/or biases may, e.g., be (i) trained in an amount of time satisfying a smallness criterion (e.g., less than about a day or two, the use of more GPUs and/or a pre-scaling operation being contributory to further reduction(s) in training time) and (ii) applied to various parts of the model. That is, the resulting compression from the scaling may, e.g., be performed to a different extent based on an amount of processing resources such that a varying amount of information is optionally lost.

In some embodiments, information component 30 may convert the image predicted by component 34 and compare the predicted TEC values to a vertical TEC (VTEC) dataset of server 66. For example, once the aforementioned conversion is performed, actual TEC values may be obtained, and the converted TEC values may be more accurate than the interpolated NOAA map to indicate improved performance. A dataset obtained from server 66 may only have TEC data at certain locations. But herein-contemplated comparisons may not just be of color intensity but rather comparisons of predicted TEC values with the actual value from server 66. The VTEC, though, may not be a continuous function. Thus, these comparisons may be at discrete points that are recorded.

Figure 3:
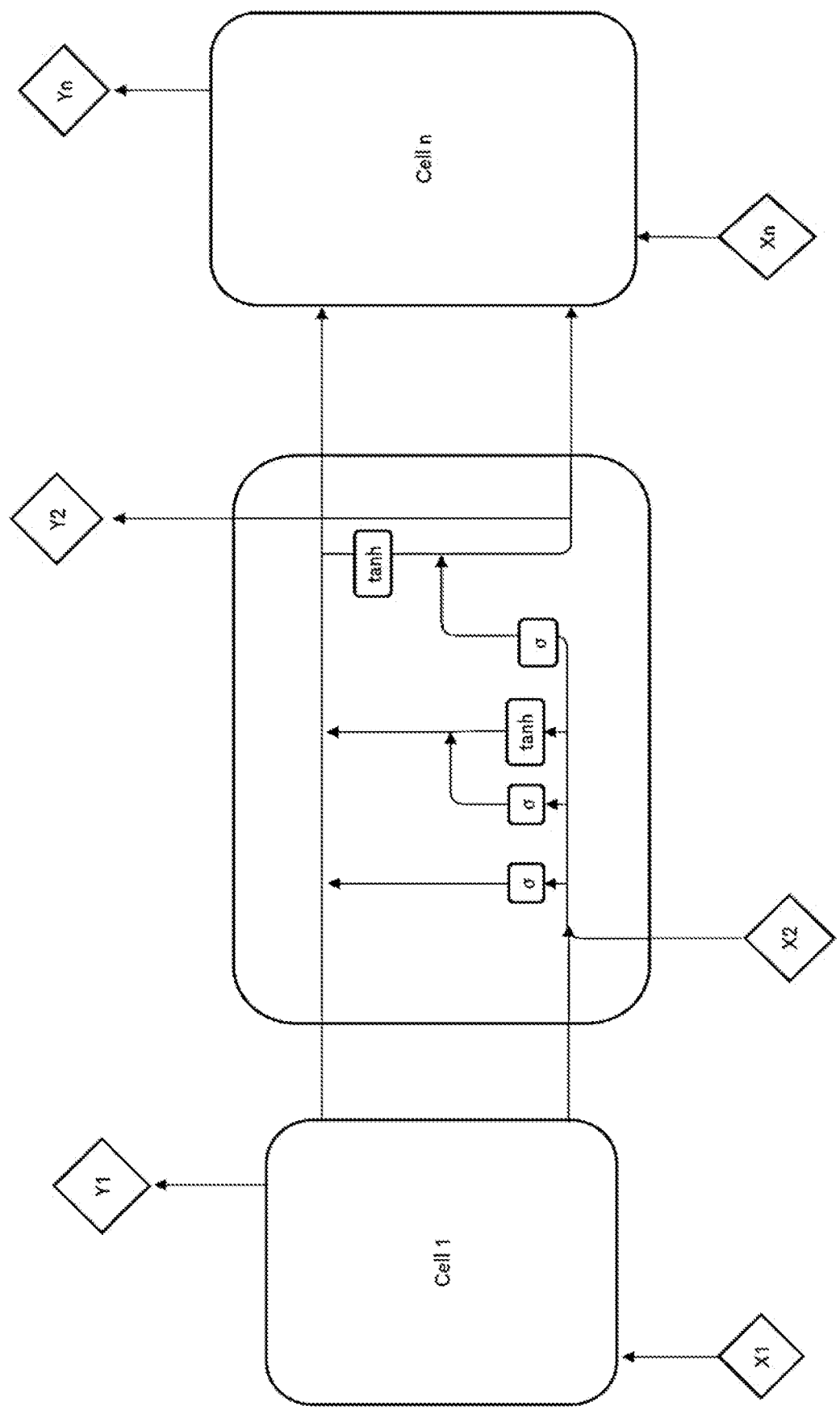
FIG. 3 illustrates an example of a long short-term memory (LSTM) model, in accordance with one or more embodiments.
Figure 5:
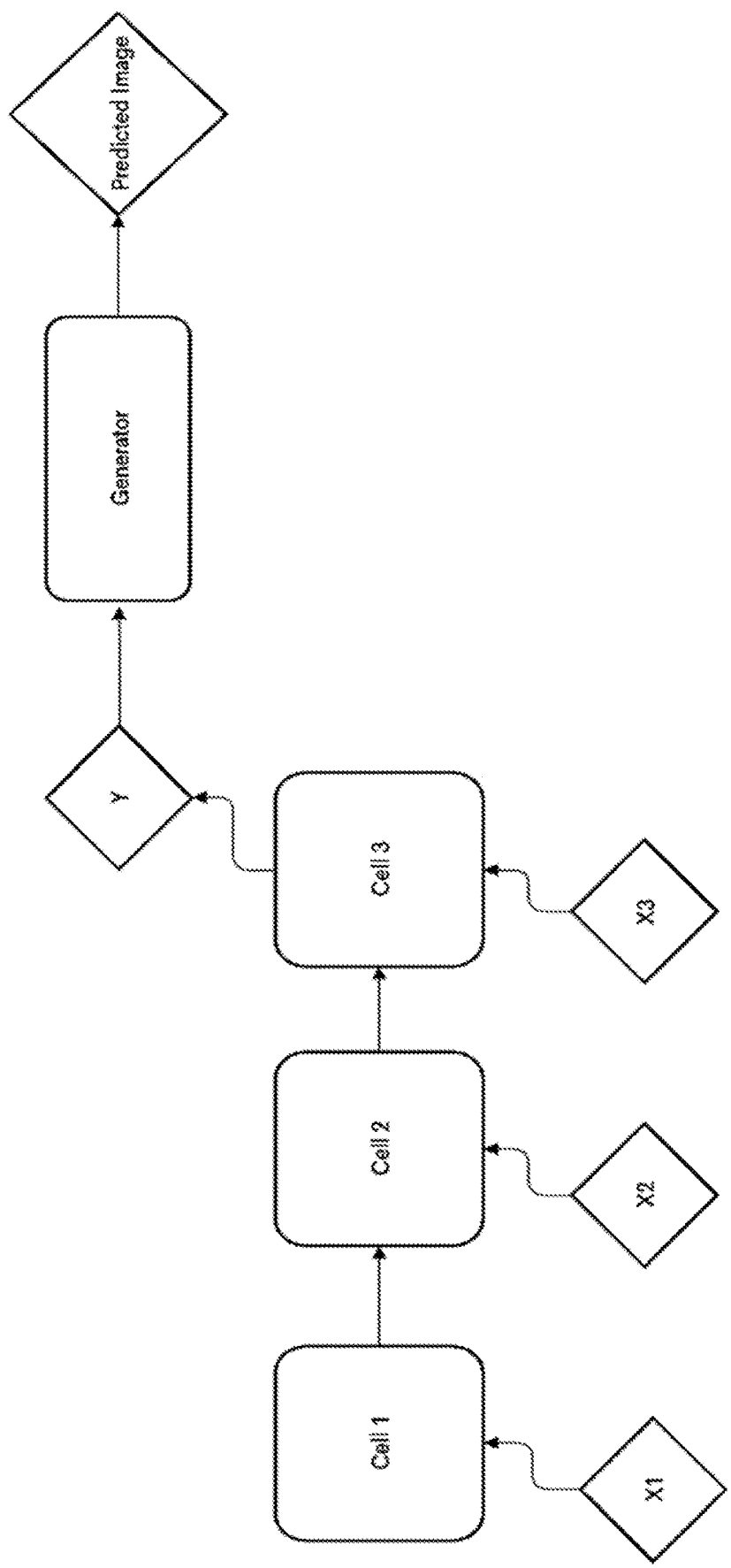
FIG. 5 illustrates an example of an LSTM-GAN model, in accordance with one or more embodiments.

In some embodiments, the LSTM model of FIGS. 3 and 5 may be trained in supervised fashion. In some embodiments, each of the LSTM and GAN models may be separately trained. And the discriminator and the generator of the GAN model may, e.g., be individually built.

In some embodiments, the LSTM model may comprise a combination of several (e.g., 10 to 15 layers) neural network layers, such as an input layer, LSTM layers (e.g., including activation functions), a hidden layer. For example, as depicted in FIG. 3, there may be used hyperbolic tangent and logistic sigmoid functions as activation functions to determine how much information to let through, outputting a value either between zero and one or between negative one and one. By using such functions together, the most optimal gatekeeping of the stored information may be allowed. In this or another example, variables $X1 \ldots Xn$ may be the input variables, and variables $Y1 \ldots Yn$ may be the predicted output (e.g., the class label). The domain may, e.g., be the output from the LSTM.

In some embodiments, the LSTM of FIG. 3 or another model may be configured to be bidirectional, e.g., for retraining the model and using future or current data to optimally predict data.

Figure 4:
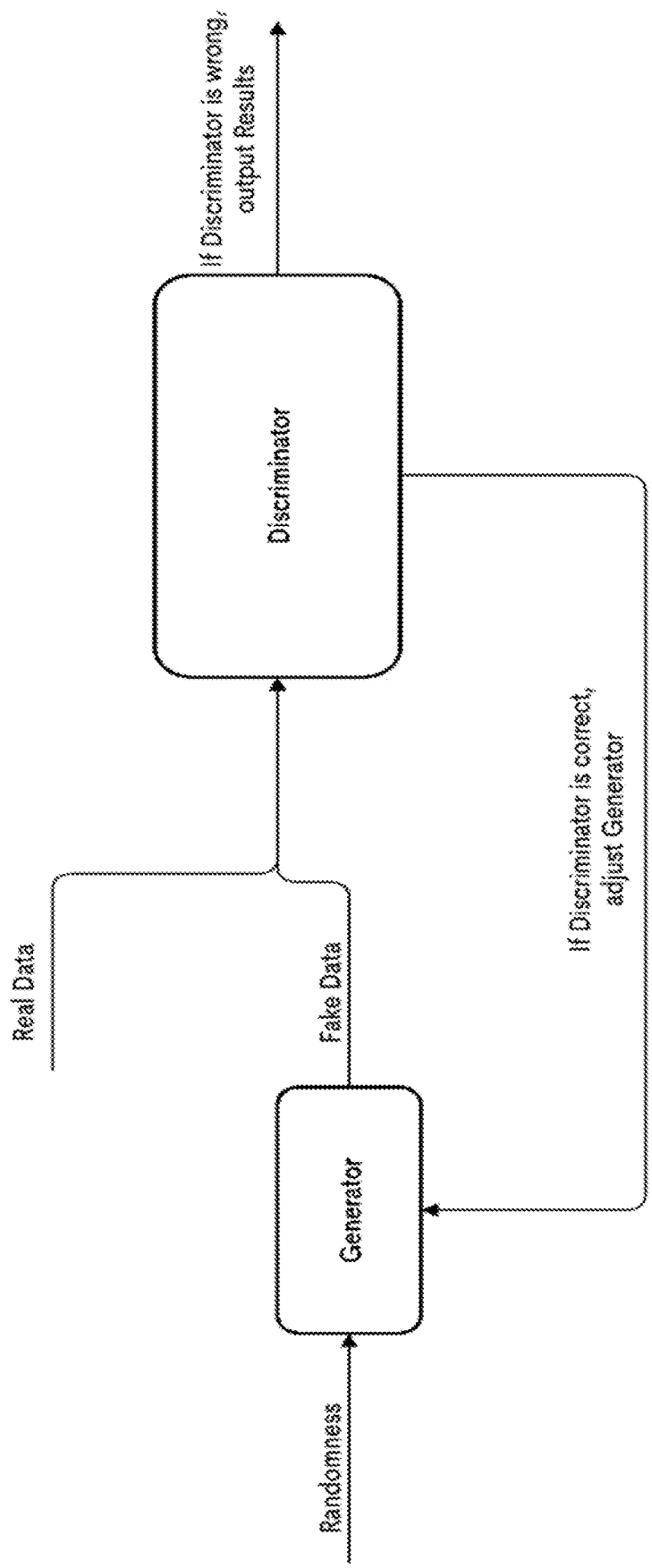
FIG. 4 illustrates an example of a generative adversarial network (GAN) model, in accordance with one or more embodiments.

In some embodiments, the GAN model of FIG. 4 may also comprise a combination of several layers, including ReLU layers, two-dimensional (2D) convolution layers, and/or other neural network layers (e.g., a leaky rectified linear unit) in a sequence. Each layer may apply different mathematical formulas to tensor arrays, e.g., with weights and biases. In these or other embodiments, the GAN model may allow image-to-image translation and improve the LSTM model's performance, such as by improving the image quality.

The discriminative modeling of FIG. 4 may, e.g., perform classification to predict whether data is real or fake. For example, the RGB distribution may be looked at on all the inputted images (e.g., the set of real data and the generated data), and the discriminator may attempt to find an outlier and choose the outlier that it believes is the generated data. If the discriminator incorrectly chooses the outlier, then that data may be classified as real.

The discriminator of FIG. 4 may, e.g., perform domain-specific data augmentation. Whereas the generator may, e.g., be a deconvolutional neural network, the discriminator may, e.g., be a CNN. In these or another example, the GAN model of FIG. 4 may provide a generative solution in the image-to-image translation. For this GAN model, the domain may, e.g., be random noise that continuously gets trained until it is not random noise and becomes instead data.

The GAN model of FIGS. 4-5 may, e.g., automatically discover and learn patterns in input data in such a way that the model can be used to generate or output new examples that plausibly could have been drawn from the original dataset. In an implementation, the generator and discriminator models may be trained together in a zero-sum game (e.g., which may be adversarial, with the generator network competing against an adversary, the discriminator network) until the discriminator model is fooled about half the time, meaning that the generator model is generating plausible examples. In other words, the discriminator may, e.g., attempt to distinguish between samples drawn from the training data and samples drawn from the generator. In some embodiments, given a training set, the GAN model of FIGS. 4-5 may learn to generate new data with the same statistics as the training set. The generator may, e.g., be updated based on how well the generated samples fooled the discriminator. This model may, e.g., be trained to generate new, plausible samples in the input distribution, such as Naive Bayes, latent Dirichlet allocation (LDA), and gaussian mixture model (GMM).

In some embodiments, the generative network generates candidates while the discriminative network evaluates them. The contest operates in terms of data distributions. The generative network may, e.g., learn to map from a latent space to a data distribution of interest, while the discriminative network may distinguish candidates produced by the generator from the true data distribution. The generative network's training objective may, e.g., be to increase the error rate of the discriminative network (i.e., fool the discriminator network by producing novel candidates that the discriminator thinks are not synthesized by being part of the true data distribution).

In some embodiments, a known dataset may serve as initial training data 62 for the discriminator. Such training may, e.g., involve presenting the model with samples from the training dataset until achieving acceptable accuracy. The generator trains based on whether it succeeds in fooling the discriminator. As mentioned, the generator may be seeded with randomized input sampled from a predefined latent space (e.g., a multivariate normal distribution). Thereafter, candidates synthesized by the generator may be evaluated by the discriminator.

The GAN model of FIG. 4 may treat an unsupervised problem as supervised because while technically it is unsupervised the discriminator essentially treats it as supervised, when looking at the real data versus the generated data of the generator. Further contemplated is a GAN for semi-supervised learning, fully supervised learning, and reinforcement learning.

Figure 6B:
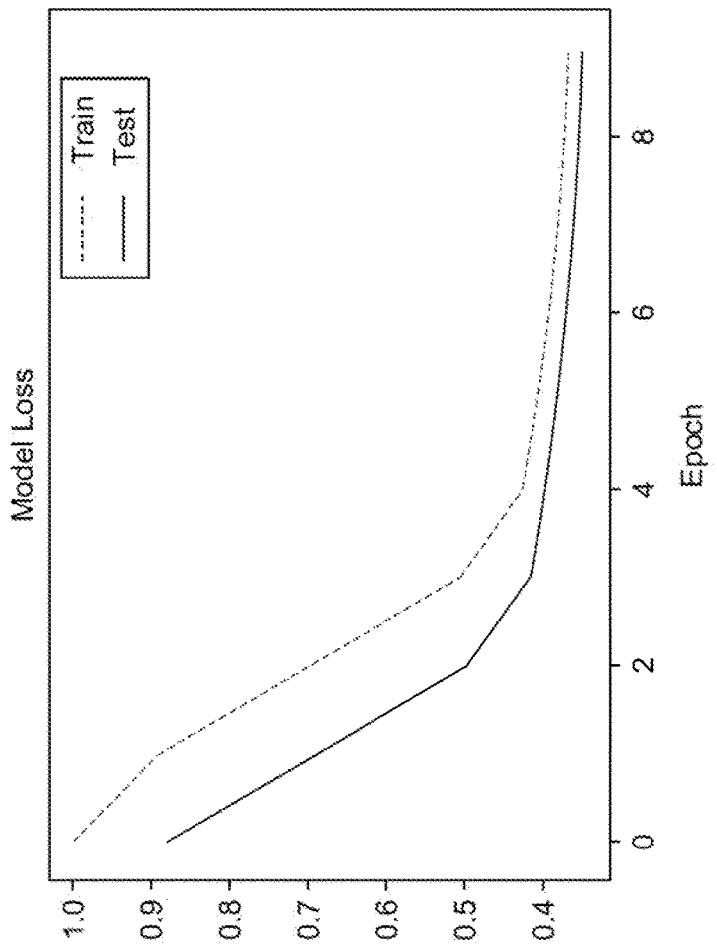
Figure 6A:
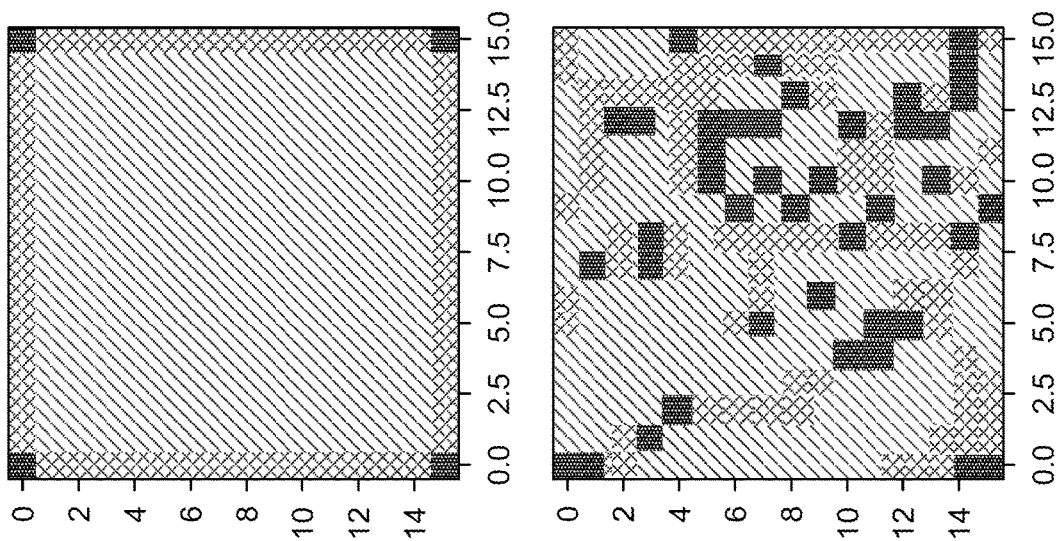
Figure 8B:
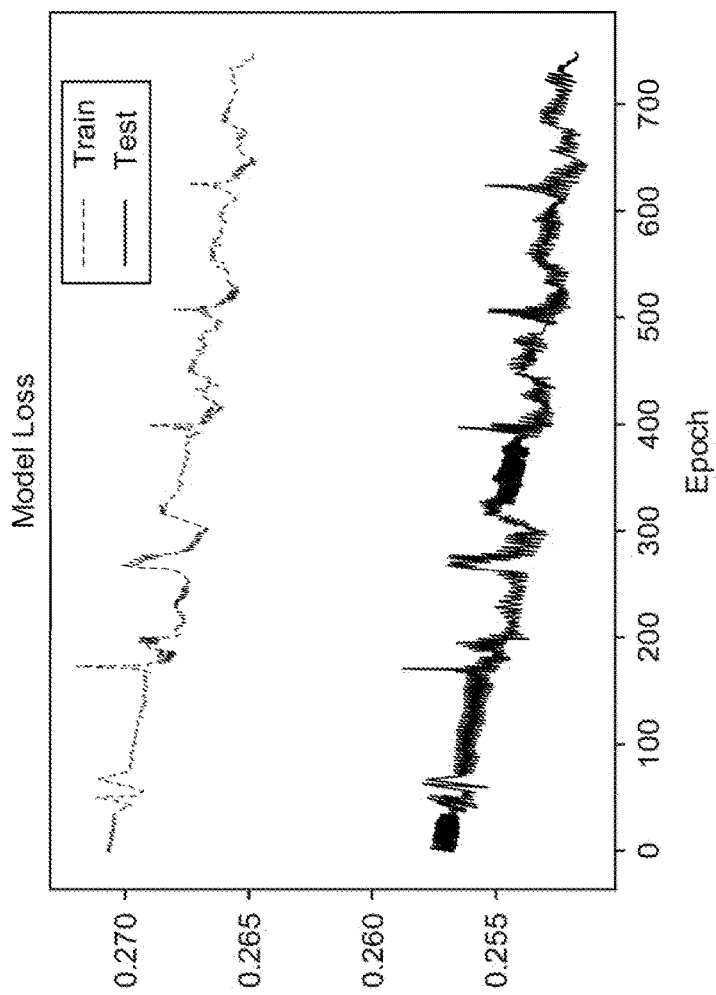
Figure 8A:
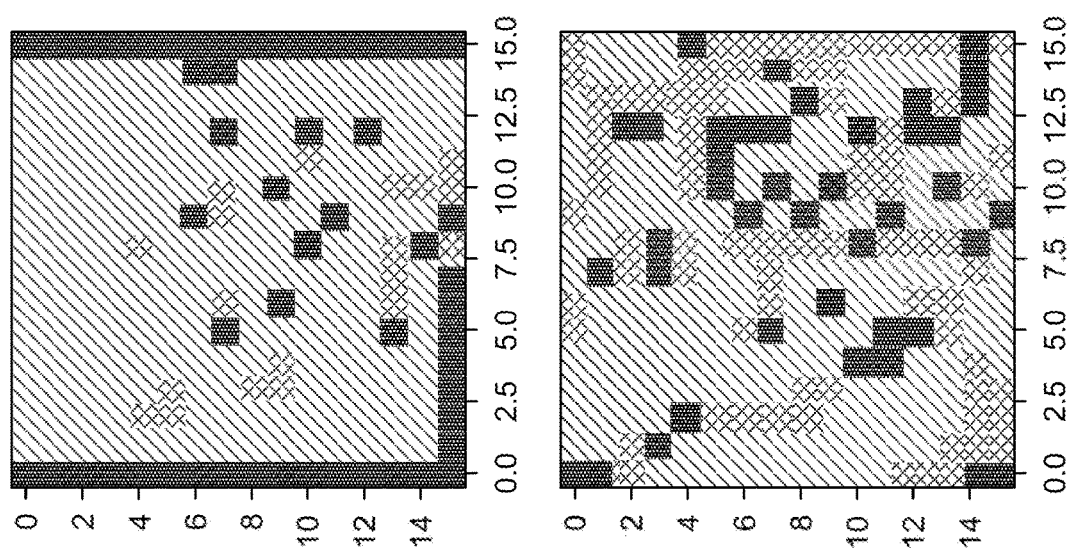

In some embodiments, an output of model 64 may be sequential vectors of TEC, with a certain dimension. For example, this output may comprise a three day sequence as a five-dimensional vector (e.g., 3,96,16,16,3). In this example array, the 3 represents days, the 96 represents images, and the 16's represent a pixel count (e.g., 16 by 16 pixels of an image of a map, as depicted in FIGS. 6A, 7A, and 8A). In this or another example, there may be 288 images in a single, sequential output that may, e.g., be made up of 3 days of 96 images each day. For example, 1 image may be obtained from database 66 every 15 minutes, resulting in 4 images per hour and 96 total per day. The number of days input into model 64 may be predetermined and/or user-adjustable (e.g., via UI devices 18), but the more information being input the larger the amount of time that may be taken to train and predict. As such, system 10 may determine an optimal tradeoff between an amount of information and an amount of processing time.

In some embodiments, LSTM-GAN model 64 may be trained to output, e.g., all three predicted days at once at the end. For example, any number of samples, such as 288 samples, may be predicted in this pipeline. In the LSTM portion of the example of FIG. 5, the output of cell one may be fed into the input of cell two. Accordingly, three cells are in the example of FIG. 5, since this example predicts three days' worth of TEC data. The cells of the LSTM model may thus be grouped in ways intended for prediction. For example, if trying to predict three days of output using three days of input for supervision, the model may be grouped in sets of six day increments.

In some embodiments, prediction model 64 may perform better (e.g., in task awareness or recognition for predicting TEC maps), when using a same amount of input and output data. For example, when training, model 64 may train easier or be more likely to converge with the same number of input and output data. As a result of this better training, the predicted output may be more accurate. The training of each of the LSTM and GAN models may be performed using as much data as desired (e.g., several months' or years' worth).

In some embodiments, the LSTM model may be an autoencoder-LSTM. For example, once fit, an encoder part of the model can be used to encode or compress sequence data that in turn may be used in data visualizations or as a feature vector input to a supervised learning model.

In some embodiments, the LSTM model of the example of FIG. 3 may comprise an RNN architecture, which implies (i) an internal state that can represent context information and (ii) storing information about past inputs for an amount of time that is arbitrary or not fixed a priori, this time rather depending on weights and on the input data. And this LSTM model may model temporal sequences and their long-range dependencies. There may be, in some embodiments of this specific form of an RNN, a criterion satisfying level of resistance to noise or other fluctuations in the input data, when predicting. For example, the RNN may process the past data and fill in missing parameters or other data. In this or another example, model 64 may, e.g., over time gradually recognize better when data are just noise or outliers by implementing math formulas and linear algebra to support their instances by either ignoring them if they are noises or filling in details if there are a lack of data (e.g., due to lapses).

The LSTM model may have feedback connections. The LSTM model may, e.g., process single data points (such as images) and entire sequences of data (e.g., speech, video, TEC, or another set of sensed information). LSTM units, such as the cells of FIG. 3, may have an input gate, an output gate, and/or a forget gate. The cell may remember values over arbitrary time intervals, and these gates may regulate the flow of information into and out of the cell. Herein-disclosed LSTM networks may have a relative insensitivity to gap length.

The cells of the LSTM unit may, e.g., be responsible for keeping track of the dependencies between the elements in the input sequence. For example, the input gate may control the extent to which a new value flows into the cell, the forget gate may control the extent to which a value remains in the cell, and the output gate may control the extent to which the value in the cell is used to compute the output activation of the LSTM unit. In some implementations, there may be connections in and out of the LSTM gates, a few of which being recurrent. The weights of these connections, which need to be learned during training, may determine how the gates operate. Some contemplated variants of the LSTM unit of FIGS. 3 and 5 include a peephole LSTM and a peephole convolutional LSTM. And further contemplated herein is use of a gated recurrent units (GRU), which does not have an output gate, as the LSTM unit.

As depicted in the LSTM model of FIG. 3, some implementations may, e.g., have constant error flow through constant error carrousels (CECs) within cells. Due to training and testing of neural networks there may be vanishing gradients, e.g., with a change in long-term memory being small enough that the model disregards it. These CECs may, e.g., implement a smaller sub-cell inside a cell that has a constant weight and be applied to memory outputs within the cell. In this or another example, the model may be allowed to properly learn in the long term, while minimizing the risk of these vanishing gradients. In embodiments alternative to those involving CECs, a gatekeeping function may be added to preexisting ones, being, e.g., a forget function. And that addition may, e.g., alternatively resolve the vanishing gradient problem. In FIG. 3, the second sigmoid function may, e.g., be operating as a forget function.

In some embodiments, the use of GAN may solve the problem of high input data dimension and improve the quality of the desired image.

In some embodiments, the GAN model may have feedforward neural networks. But independent backpropagation procedures may be applied to both the generator and discriminator networks so that the generator produces better images, while the discriminator becomes more skilled at flagging synthetic images.

FIG. 6A depicts an example of LSTM model training, e.g., including prediction results after 10 epochs (which may be approximately 30 seconds of training). And FIG. 6B depicts a corresponding model loss after 10 epochs. FIG. 7A similarly depicts an example of LSTM model training, e.g., including prediction results after 250 epochs (which may be approximately 15 minutes of training of training). And FIG. 7B depicts a corresponding model loss after 250 epochs. FIG. 8A similarly depicts an example of LSTM model training, e.g., including prediction results after 750 epochs (which may be approximately 45 minutes of training). And FIG. 8B depicts a corresponding model loss after 750 epochs. But these examples are not intended to be limiting, as herein-contemplated are different numbers of training epochs, such as 100, 500, and 1000 epochs.

In some embodiments, an epoch may be a cycle of LSTM-GAN model 64 assigning weights. For example, one epoch may be a round of assigned weights before the weights are adjusted.

The model loss may inform as to how well the machine learning model is predicting, e.g., using a set of weights and biases. By the losses decreasing (e.g., of the generator and discriminator), the respective model shows improvement over time. In the examples of FIGS. 6B, 7B, and 8B, the model loss decreases as more epochs of LSTM training take place. In these or other examples, as the model loss decreases the prediction may be getting more accurate (e.g., compared to what it should actually be). FIGS. 6B, 7B, and 8B show different lengths of training time, and that model loss improvements accrue over a longer period of time.

Figure 9B:
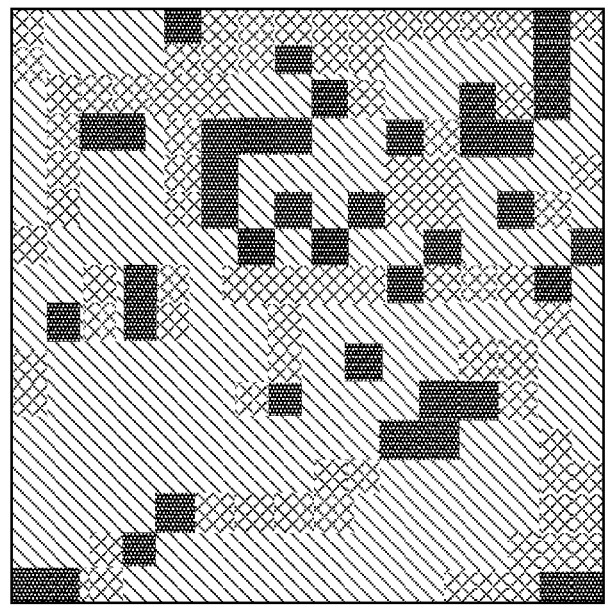
FIG. 9B illustrates an average error over a single predicted day, in accordance with one or more embodiments.
Figure 9A:
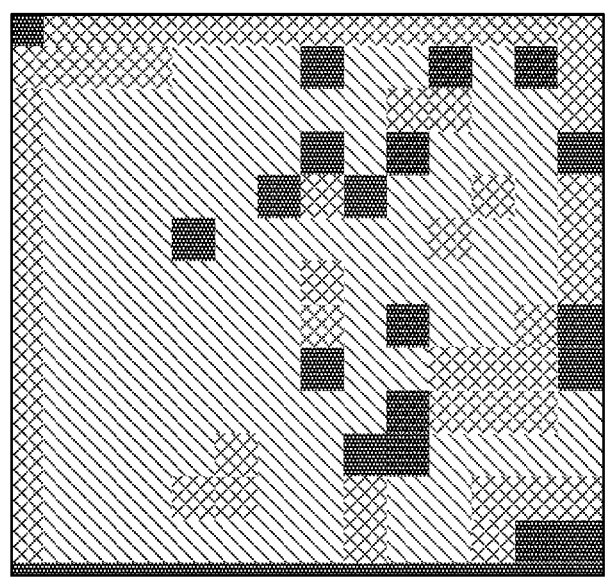
FIG. 9A illustrates preliminary prediction results when using an LSTM model, in accordance with one or more embodiments.

FIG. 9A depicts an example of results of using an LSTM model. This example includes preliminary prediction results after 1000 epochs of training (which may be approximately 1 hour of training). The different colors or color intensities depict different predicted TECs for different regions of a map. FIG. 9B correspondingly depicts results of using the LSTM model, including an average RMSE over a single day's prediction of 0.0824, which may be small enough to improve upon the predictions of server 66.

FIG. 10A depicts progress and results of using a GAN model. That is, this example depicts loss of the GAN model after 24 hours of training.

In FIG. 10B, there are 64 images, e.g., which may have been stored as part of training data 62. For example, they may be used to train the GAN model.

Figure 11C:
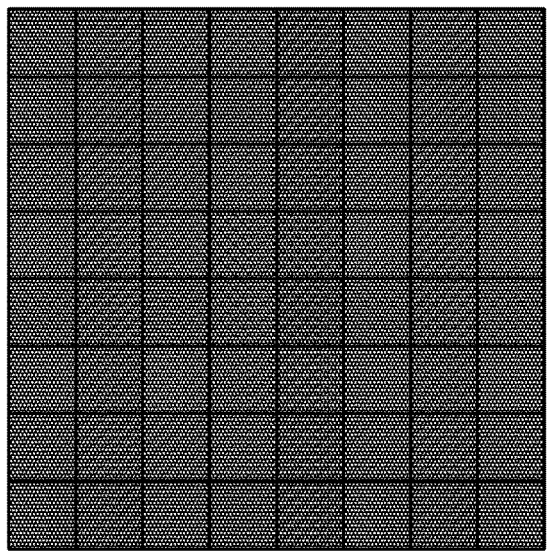
FIGS. 11A, 11B, and 11C illustrate progressive improvement of predicted TEC maps, in accordance with one or more embodiments.
Figure 11B:
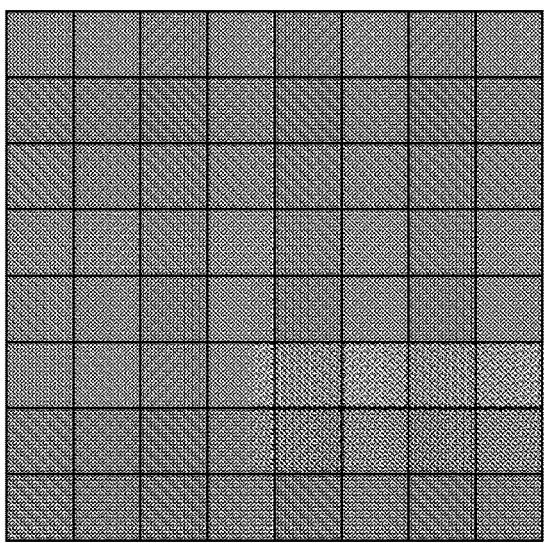
Figure 11A:
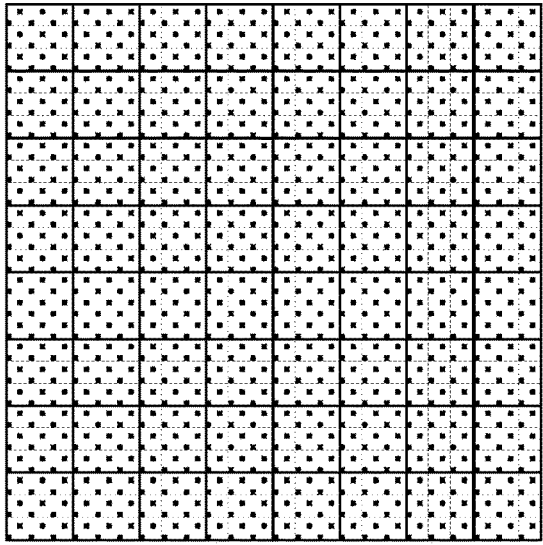

FIGS. 11A-11C depict training progress starting from FIG. 11A and progressing through FIG. 11B to FIG. 11C. The GAN model shows slows improvement over time, the improvement of which almost stops after about 5 hours. More training images, a longer training time, and use of scaled down training images may improve the GAN model further.

Each of FIGS. 11A, 111B, and 11C depicts 64 images of a grid of images predicted by the GAN model. As depicted in the top-middle portion of FIG. 10A, when the generator loss increases the discriminator loss decreases. But this is not intended to be limiting, and it may not be intentional. What is intentional, though, is the exemplary darkening of each tile of the grids of FIG. 11A to FIG. 11B, which further darkens in FIG. 11C. That is, these three FIGS. depict improvement, e.g., from random noise to progressively looking more like the grid of FIG. 10B. As such, the generator loss may continually decrease.

In some embodiments, trained model 64 may operate well even in view of unpredictable ionospheric storms, variations, or other sudden propagation effects. For example, although a first predicted frame may not be optimal upon arrival of a storm, once the storm is there the model may predict well as to how the TEC is going to react for the duration of the storm.

Figure 12:
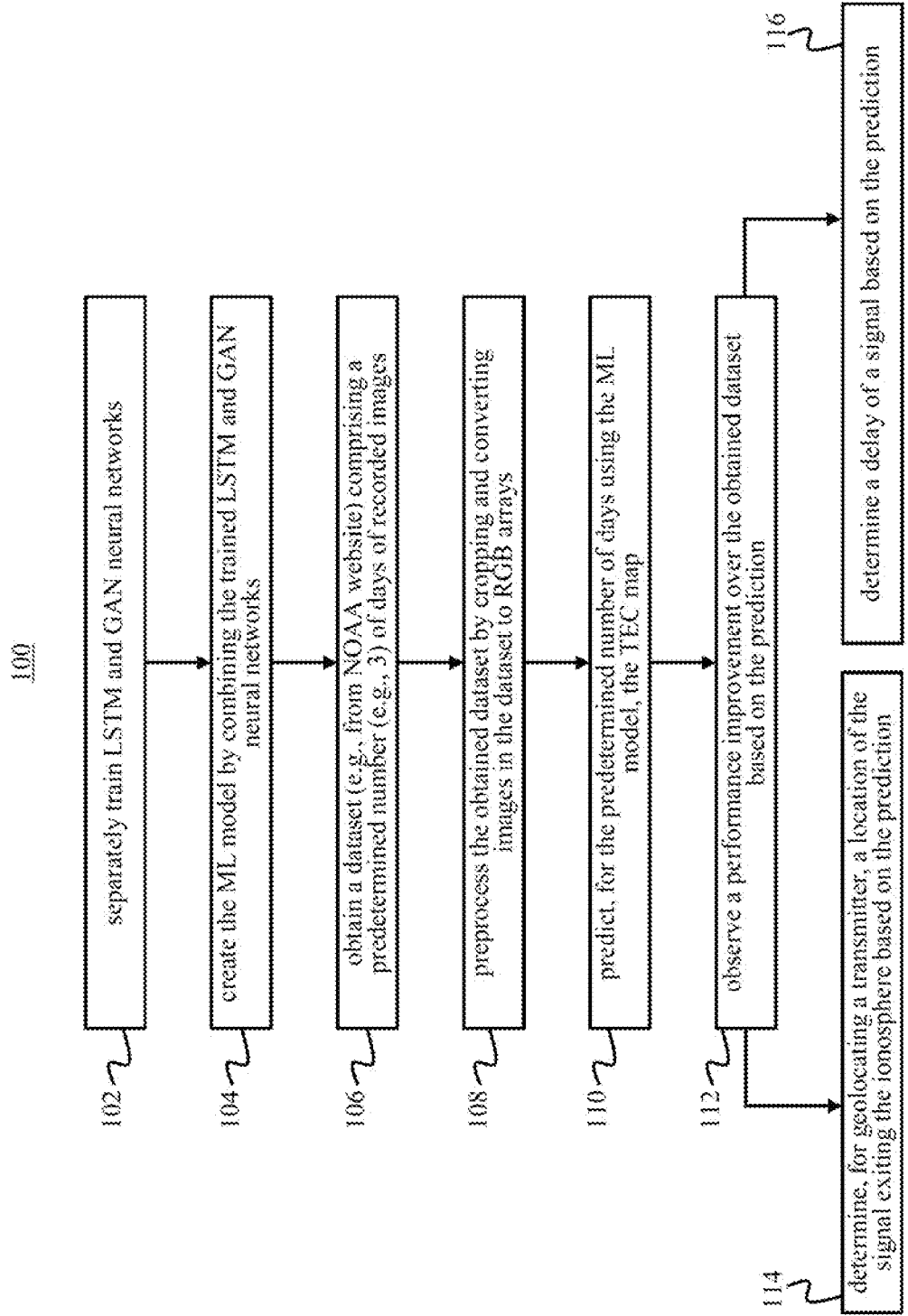
FIG. 12 illustrates a process for implementing a predictive LSTM-GAN model, in accordance with one or more embodiments.

FIG. 12 illustrates method 100 for using an LSTM-GAN model to improve TEC recordings and predictions, in accordance with one or more embodiments. Method 100 may be performed with a computer system comprising one or more computer processors and/or other components. The processors are configured by machine readable instructions to execute computer program components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 5 and described below is not intended to be limiting. In some embodiments, method 100 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 100 in response to instructions stored electronically on an electronic storage medium. The processing devices may include one or more devices configured through hardware, firmware, and/or software to be specifically designed for execution of one or more of the operations of method 100.

At operation 102 of method 100, LSTM and GAN neural networks may be separately trained. As an example, the LSTM model of FIG. 3 may be trained, and the GAN model of FIG. 4 may be trained. In some embodiments, operation 102 is performed by a processor component the same as or similar to training component 32 (shown in FIG. 1 and described herein).

At operation 104 of method 100, the ML model may be created by combining the trained LSTM and GAN neural networks. As an example, LSTM-GAN model 64 may be implemented. For example, this pipelined model may be implemented using TensorFlow, Keras, and PyTorch.

At operation 106 of method 100, a dataset may be obtained, e.g., from NOAA website, which may comprise a predetermined number (e.g., 3) of days of recorded images. In some embodiments, operation 106 is performed by a processor component the same as or similar to information component 30 (shown in FIG. 1 and described herein).

At operation 108 of method 100, the obtained dataset may be preprocessed by cropping and converting images in the dataset to RGB arrays. In some embodiments, operation 108 is performed by a processor component the same as or similar to information component 30 (shown in FIG. 1 and described herein).

At operation 110 of method 100, the TEC map may be predicted, for the predetermined number of days using the ML model. In some embodiments, operation 110 is performed by a processor component the same as or similar to prediction component 34 (shown in FIG. 1 and described herein).

At operation 112 of method 100, a performance improvement may be observed over the obtained dataset based on the prediction. For example, by model 64 eliminating the outlier inaccuracies and as more lapses are encountered and avoided, prediction component 34 may result in an output with better accuracy.

At operation 114 of method 100, a location of the signal exiting the ionosphere may be determined, for geolocating a transmitter, based on the prediction. And, at operation 116 of method 100, a delay of a signal may be determined based on the prediction. These alternative (but not mutually exclusive) operations may be performed by information component 30.

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the disclosure are specifically illustrated and/or described herein. However, it will be appreciated that modifications and variations are contemplated and within the purview of the appended claims.

What is claimed is:

1. A method for predicting total electron content (TEC) in an ionosphere, comprising:
   obtaining a dataset;
   preprocessing the obtained dataset by cropping and converting images in the dataset to red, green and blue (RGB) arrays;
   inputting the dataset into a machine learning (ML) model, wherein the ML model is a combination of a long short-term memory (LSTM) neural network and a generative adversarial network (GAN) neural network;
   training the LSTM-GAN ML model for at least 10 epochs, wherein each epoch includes a cycle of the LSTM-GAN ML model with assigned weights, and wherein the assigned weights are adjusted between successive epochs;
   predicting, for a predetermined number of days, the TEC using the LSTM-GAN ML model; and
   observing a performance improvement in loss after the at least 10 epochs over the obtained dataset based on the prediction,
   wherein the prediction is made for a region having a number of ground transmitters satisfying a sparseness criterion.

2. The method of claim 1, wherein no interpolation of the prediction is performed by the ML model.

3. The method of claim 1, further comprising:
   determining a delay of a signal based on the prediction.

4. The method of claim 3, further comprising:
   determining, for geolocating a transmitter, a location of the signal exiting the ionosphere based on the prediction.

5. The method of claim 1, wherein the predetermined number of days is 2 to 5 days for (i) an amount of data in the obtained dataset input into the ML model and (ii) an amount of days of the prediction output from the ML model.

6. The method of claim 1, wherein the obtained dataset has at least one of a data lapse, an amount of noise, and an outlier.

7. The method of claim 1, wherein the preprocessing further includes (i) performing an extraction from the images and (ii) scaling-down or compressing the cropped images.

8. The method of claim 1, wherein the preprocessing further includes removing an outline of a map comprised in the images.

9. The method of claim 1, further comprising:
   separately training the LSTM and GAN neural networks, wherein the combination is performed after the separate trainings of the LSTM and GAN neural networks.

10. The method of claim 1, wherein the performance improvement of the prediction comprises a root mean square (RMS) error satisfying a smallness criterion, the RMS error being based on a comparison of color intensity of each pixel of RGB arrays between the obtained dataset and the prediction.

11. The method of claim 5, wherein the predetermined number of days is 3, and
    wherein an amount of days of the dataset inputted into the ML model is the same as an amount of days in the prediction such that training of the ML model causes more accurate prediction in deployment.

12. The method of claim 1, further comprising:
    displaying, via a user interface, an image of the predicted TEC.

13. The method of claim 12, further comprising:
displaying, via the user interface, a representation of a vertical TEC dataset in comparison with the predicted TEC.

14. A method for predicting TEC in an ionosphere, comprising:
obtaining a dataset;
preprocessing the obtained dataset by cropping and converting images in the dataset to red, green and blue (RGB) arrays;
inputting the dataset into a LSTM-GAN ML model;
training the LSTM-GAN ML model for at least 10 epochs, wherein each epoch includes a cycle of the LSTM-GAN model with assigned weights, and wherein the assigned weights are adjusted between successive epochs;
predicting, for a predetermined number of days, the TEC using the LSTM-GAN ML model; and
determining a delay of a signal based on the prediction.

15. The method of claim 14, wherein the prediction is made for a region having a number of ground transmitters satisfying a sparseness criterion.

16. The method of claim 14, wherein the predetermined number of days is 2 to 5 days for (i) an amount of data in the obtained dataset input into the ML model and (ii) an amount of days of the prediction output from the ML model.

17. The method of claim 14, wherein the preprocessing further includes (i) performing an extraction from the images and (ii) scaling-down or compressing the cropped images.

18. The method of claim 14, further comprising:
displaying, via a user interface, an image of the predicted TEC.

19. A method for predicting TEC in an ionosphere, comprising:
obtaining a dataset;
preprocessing the obtained dataset by cropping and converting images in the dataset to red, green and blue (RGB) arrays;
inputting the dataset into a LSTM-GAN ML model;
training the LSTM-GAN ML model for at least 10 epochs, wherein each epoch includes a cycle of the LSTM-GAN ML model with assigned weights, and wherein the assigned weights are adjusted between successive epochs;
predicting, for a predetermined number of days, the TEC using the LSTM-GAN ML model; and
determining, for geolocating a transmitter, a location of a signal exiting the ionosphere based on the prediction.

20. The method of claim 19,
wherein the preprocessing further includes:
(i) performing an extraction from the images,
(ii) scaling-down or compressing the cropped images, and
(iii) removing an outline of a map comprised in the images.

* * * * *